United States Patent
Nakajima et al.

(10) Patent No.: US 10,189,325 B2
(45) Date of Patent: Jan. 29, 2019

(54) AMPHIBIOUS VEHICLE AND CONTROL METHOD FOR THE SAME

(71) Applicant: MITSUBISHI HEAVY INDUSTRIES, LTD., Tokyo (JP)

(72) Inventors: Ryo Nakajima, Tokyo (JP); Takashi Matsunaga, Tokyo (JP); Katsumi Takagi, Tokyo (JP); Keisuke Yamamoto, Tokyo (JP); Masatsugu Monde, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/522,793

(22) PCT Filed: Nov. 7, 2014

(86) PCT No.: PCT/JP2014/079639
§ 371 (c)(1),
(2) Date: Apr. 28, 2017

(87) PCT Pub. No.: WO2016/072028
PCT Pub. Date: May 12, 2016

(65) Prior Publication Data
US 2017/0313147 A1    Nov. 2, 2017

(51) Int. Cl.
*B60F 3/00* (2006.01)
*B63H 11/00* (2006.01)

(52) U.S. Cl.
CPC ............. *B60F 3/00* (2013.01); *B60F 3/0015* (2013.01); *B60F 3/0038* (2013.01); *B63H 11/00* (2013.01)

(58) Field of Classification Search
CPC ... B63H 11/00; B60F 3/00; B60F 3/38; B60F 3/0038
See application file for complete search history.

(56) References Cited

U.S. PATENT DOCUMENTS

| 3,420,204 A | * | 1/1969 | Samuel | B63H 11/11 440/12.56 |
| 4,852,521 A | * | 8/1989 | Harrington | B60F 3/0007 119/51.04 |
| 6,595,812 B1 | * | 7/2003 | Haney | B60F 3/0015 114/360 |

FOREIGN PATENT DOCUMENTS

| JP | 3-32941 A | 2/1991 |
| JP | 6-81685 A | 3/1994 |

(Continued)

OTHER PUBLICATIONS

International Search Report, issued in PCT/JP2014/079639, PCT/ISA/210, dated Dec. 16, 2014.

(Continued)

*Primary Examiner* — Stephen P Avila
(74) *Attorney, Agent, or Firm* — Birch, Stewart, Kolasch & Birch, LLP

(57) ABSTRACT

An amphibious vehicle includes: an engine; at least one land traveling device; at least one water propelling device; a power distribution device configured to distribute power outputted from the engine between land travel power to be supplied to the at least one land traveling device and water propulsion power to be supplied to the at least one water propelling device; a slippage-amount detection device configured to detect a slippage amount of the at least one land traveling device relative to ground; and a controller configured to adjust at least the land travel power, of the land travel power and the water propulsion power, on the basis of the slippage amount detected by the slippage-amount detection device. The controller is configured to reduce the land travel power if the slippage amount detected by the slippage-amount detection device is greater than a threshold while the land travel power and the water propulsion power are supplied respectively to the at least one land traveling device (Continued)

and the at least one water propelling device for landing from water to land.

9 Claims, 10 Drawing Sheets

(56) References Cited

FOREIGN PATENT DOCUMENTS

| | | | |
|---|---|---|---|
| JP | 8-58696 A | 3/1996 | |
| JP | 2003-48446 A | 2/2003 | |
| JP | 2010-116156 A | 5/2010 | |
| JP | 2010-215066 A | 9/2010 | |
| JP | 2010-269764 A | 12/2010 | |
| JP | 2012-171363 A | 9/2012 | |
| JP | 2013-132994 A | 7/2013 | |
| JP | 2013-132995 A | 7/2013 | |
| JP | 2014-108692 A | 6/2014 | |

OTHER PUBLICATIONS

International Preliminary Report on Patentability and the English translation of the Written Opinion of the International Searching Authority (Forms PCT/IB/326, PCT/IB/338, PCT/IB/373 and PCT/ISA/237), dated May 18, 2017, for International Application No. PCT/JP2014/079639.

* cited by examiner

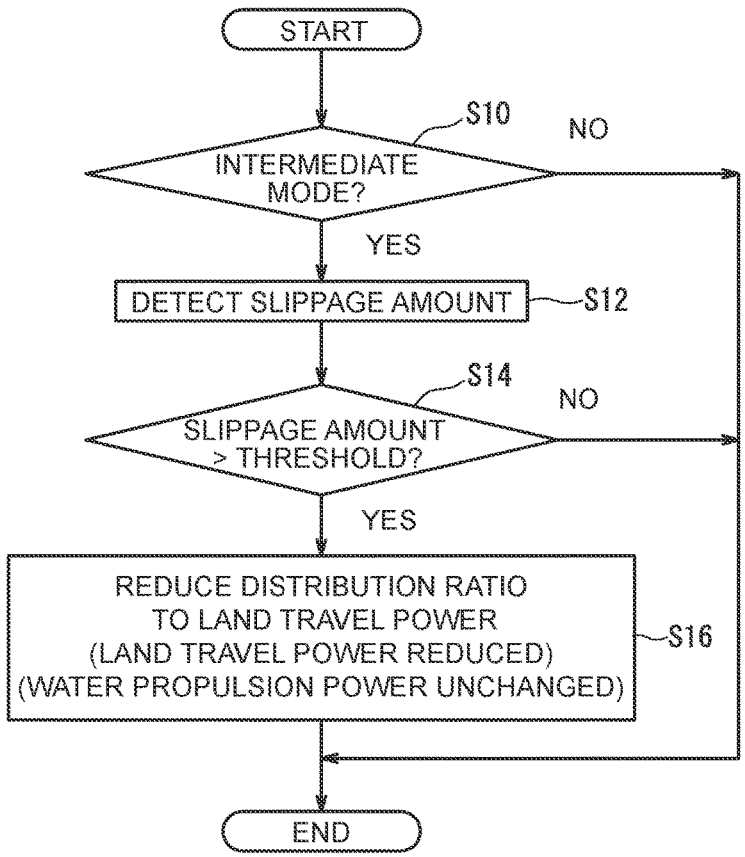

POWER DISTRIBUTION WHEN LAND TRAVELING DEVICE SLIPS

| ITEM | INCREASE/ DECREASE | EXAMPLE OF TARGET VALUE |
|---|---|---|
| DISTRIBUTION RATIO TO LAND TRAVEL POWER (LAND TRAVEL POWER/ WATER PROPULSION POWER) | DECREASE | 10/10→7/13 |
| LAND TRAVEL POWER | DECREASE | 10→7 |
| WATER PROPULSION POWER | INCREASE | 10→13 |

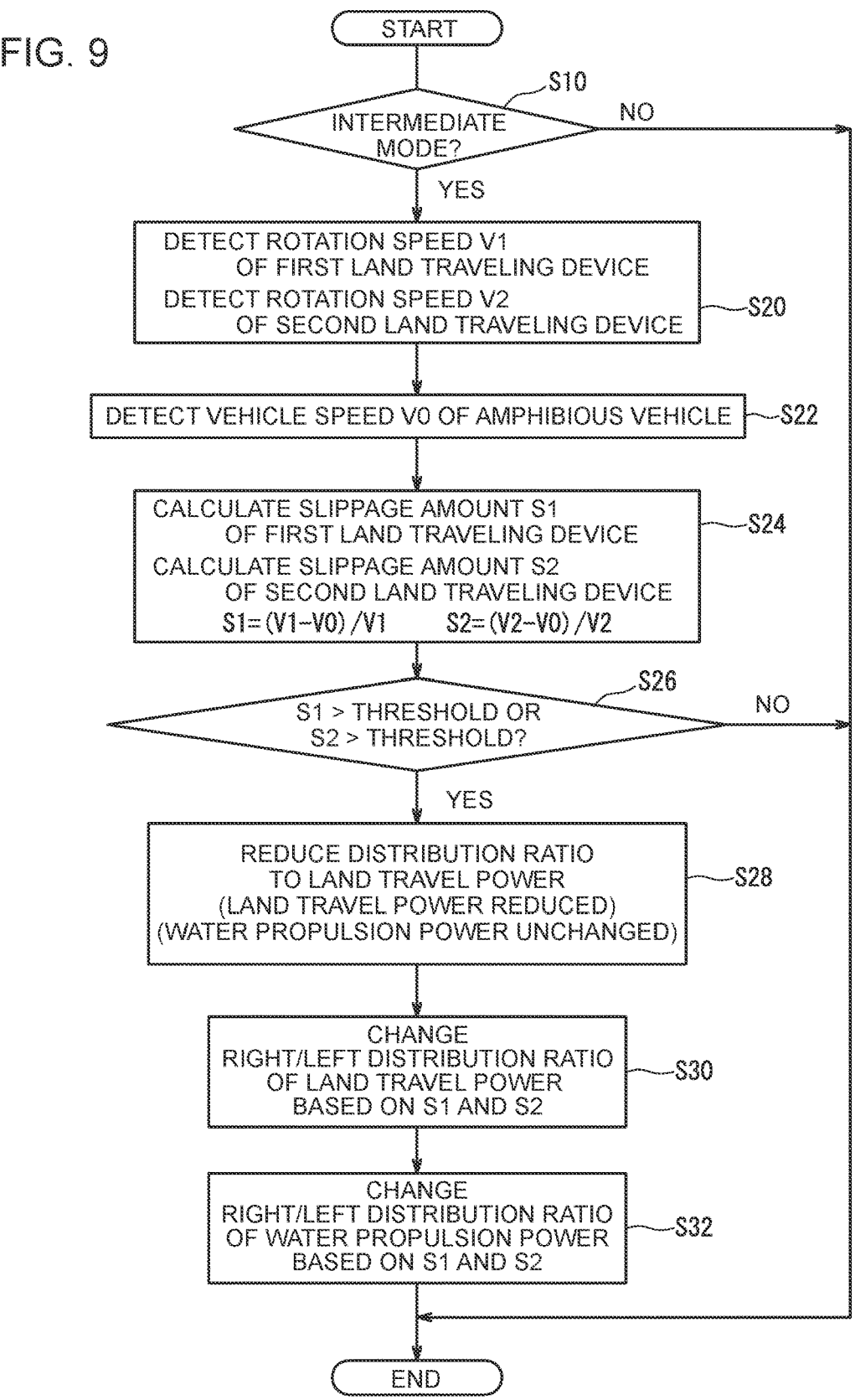

FIG. 10

POWER DISTRIBUTION WHEN LAND TRAVELING DEVICE SLIPS

| ITEM | INCREASE/ DECREASE | EXAMPLE OF TARGET VALUE |
|---|---|---|
| DISTRIBUTION RATIO TO LAND TRAVEL POWER (LAND TRAVEL POWER/ WATER PROPULSION POWER) | DECREASE | 10/10→7/10 |
| DISTRIBUTION RATIO TO FIRST LAND TRAVEL POWER (FIRST LAND TRAVEL POWER/ SECOND LAND TRAVEL POWER) | DECREASE | 5/5→3/4 |
| LAND TRAVEL POWER | DECREASE | 10→7 |
| FIRST LAND TRAVEL POWER | DECREASE | 5→3 |
| SECOND LAND TRAVEL POWER | DECREASE | 5→4 |
| DISTRIBUTION RATIO TO FIRST WATER PROPULSION POWER (FIRST WATER PROPULSION POWER/ SECOND WATER PROPULSION POWER) | INCREASE | 5/5→6/4 |
| WATER PROPULSION POWER | UNCHANGED | 10→10 |
| FIRST WATER PROPULSION POWER | INCREASE | 5→6 |
| SECOND WATER PROPULSION POWER | DECREASE | 5→4 |

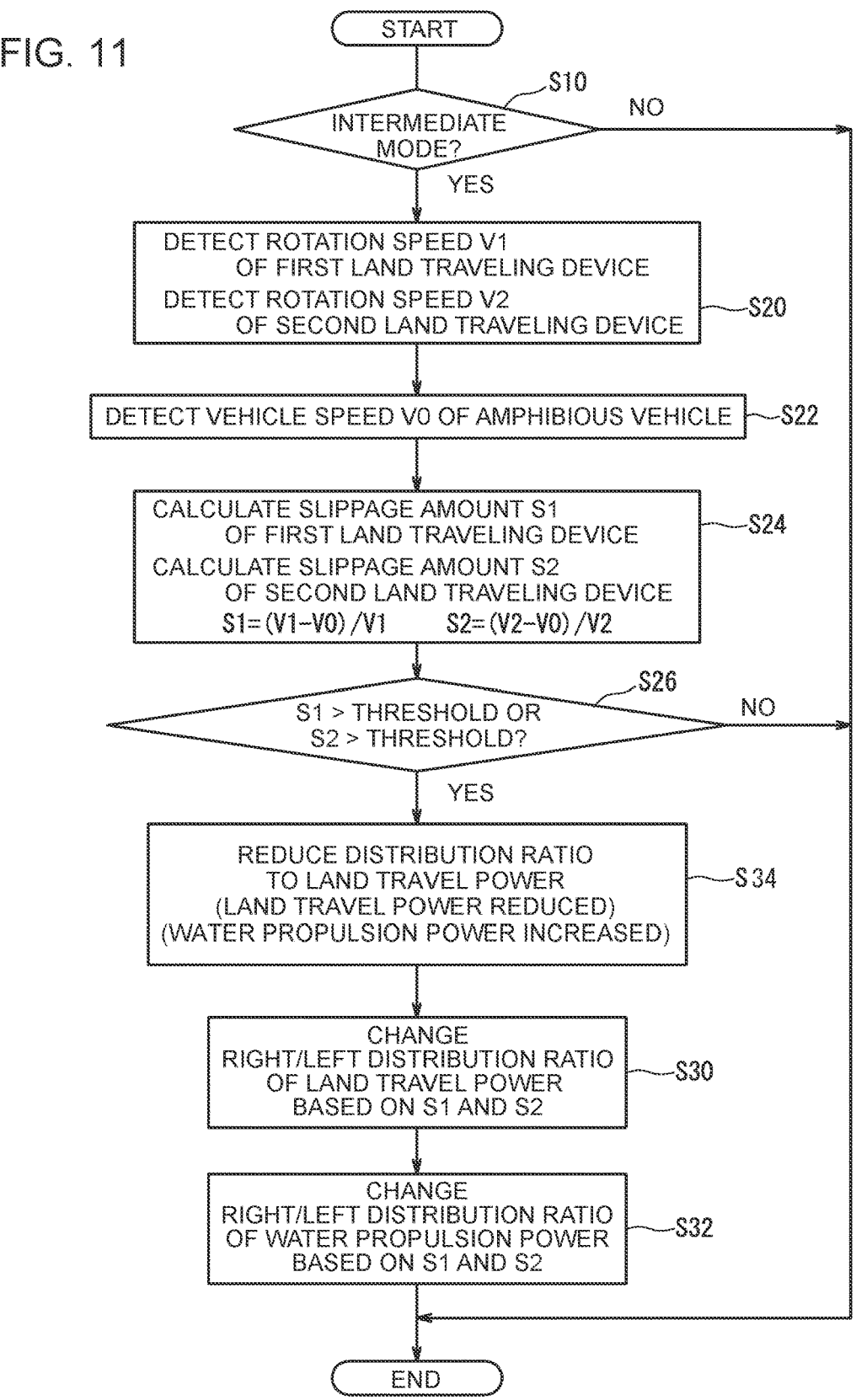

FIG. 12

POWER DISTRIBUTION WHEN LAND TRAVELING DEVICE SLIPS

| ITEM | INCREASE/ DECREASE | EXAMPLE OF TARGET VALUE |
|---|---|---|
| DISTRIBUTION RATIO TO LAND TRAVEL POWER (LAND TRAVEL POWER/ WATER PROPULSION POWER) | DECREASE | 10/10→7/13 |
| DISTRIBUTION RATIO TO FIRST LAND TRAVEL POWER (FIRST LAND TRAVEL POWER/ SECOND LAND TRAVEL POWER) | DECREASE | 5/5→3/4 |
| LAND TRAVEL POWER | DECREASE | 10→7 |
| FIRST LAND TRAVEL POWER | DECREASE | 5→3 |
| SECOND LAND TRAVEL POWER | DECREASE | 5→4 |
| DISTRIBUTION RATIO TO FIRST WATER PROPULSION POWER (FIRST WATER PROPULSION POWER/ SECOND WATER PROPULSION POWER) | INCREASE | 5/5→7/6 |
| WATER PROPULSION POWER | INCREASE | 10→13 |
| FIRST WATER PROPULSION POWER | INCREASE | 5→7 |
| SECOND WATER PROPULSION POWER | INCREASE | 5→6 | ic # AMPHIBIOUS VEHICLE AND CONTROL METHOD FOR THE SAME

TECHNICAL FIELD

The present disclosure relates to an amphibious vehicle and a control method for the same.

BACKGROUND ART

An amphibious vehicle includes, for instance, an engine, a land traveling device including a crawler or tires, a water traveling device including a water jet or a propeller, and a power distribution device which distributes power outputted from the engine between the land traveling device and the water traveling device.

Further, the amphibious vehicle disclosed in Patent Document 1 includes a vehicle controller for controlling an engine-output divider (power distribution device), a vehicle-speed sensor, and an engine rotation-torque sensor. The amphibious vehicle can be operated under three different modes: land mode, water mode, and intermediate mode. In the intermediate mode, the power of the engine is distributed between the land traveling device and the water traveling device. Further, in the intermediate mode, the output of the engine is increased if slippage of the land traveling device is detected on the basis of the vehicle speed and the engine rotation torque. Accordingly, the power of the water propelling device is increased, and the vehicle speed that has decreased due to the slippage increases and becomes stable.

CITATION LIST

Patent Literature

Patent Document 1: JP2012-171363A

SUMMARY

Problems to be Solved

A sand beach with a smooth sand area sweeping from land into water is suitable for an amphibious vehicle to make a landing on. On such a sand beach, the land traveling device does not slip on the sand at the bottom of the water when both of the land traveling device and the water traveling vehicle are operated, and thereby it is possible to make effective use of the power supplied to the land traveling device on the sand without waste. Thus, the amphibious vehicle can make effective use of the power of the engine to make a landing readily on a sand beach.

In contrast, if the amphibious vehicle makes a landing on a point where rocks or the like lie on the bottom of the water, the land traveling device may slip on the rocks or the like. If the land traveling device slips, the power supplied to the land traveling device is not only wasted but cannot be applied to the bottom of the water effectively, which may lead to failure of a smooth landing.

In view of this, an object of at least one embodiment of the present invention is to provide an amphibious vehicle and a method of controlling the amphibious vehicle, whereby slippage of a land traveling device is suppressed regardless of the condition of the bottom of water and power outputted from an engine is effectively utilized, and thus a high landing ability is achieved.

Solution to the Problems

According to at least one embodiment of the present invention, provided is an amphibious vehicle which comprises: an engine; at least one land traveling device; at least one water propelling device; a power distribution device configured to distribute power outputted from the engine between land travel power which is to be supplied to the at least one land traveling device and water propulsion power which is to be supplied to the at least one water propelling device; a slippage-amount detection device configured to detect a slippage amount of the at least one land traveling device relative to ground; and a controller configured to adjust at least the land travel power, of the land travel power and the water propulsion power, on the basis of the slippage amount detected by the slippage-amount detection device. The controller is configured to reduce the land travel power if the slippage amount detected by the slippage-amount detection device is greater than a threshold while the land travel power and the water propulsion power are supplied respectively to the at least one land traveling device and the at least one water propelling device for landing from water to land.

With the above configuration, if the slippage amount of the land traveling device is greater than a threshold, the land travel power distributed to the land traveling device is reduced, and thus wasteful consumption of power outputted from the engine is suppressed. Further, since the land travel power is reduced, the slippage of the land traveling device is dissolved, and the power of the land traveling device is effectively applied to the ground. As a result, the amphibious vehicle can make effective use of the power outputted by the engine to move forward, regardless of the condition of the bottom of water, and thus has a high landing ability.

In some embodiments, the controller is configured to increase the water propulsion power if the slippage amount detected by the slippage-amount detection device is greater than the threshold.

With this configuration, it is possible to compensate for the decrease in the land travel power by increasing the water propulsion power, and the landing ability can be improved even further.

In some embodiments, the at least one land traveling device comprises a first land traveling device disposed on a right side of the amphibious vehicle and a second land traveling device disposed on a left side of the amphibious vehicle. The at least one water propelling device comprises a first water propelling device disposed on the right side of the amphibious vehicle and a second water propelling device disposed on the left side of the amphibious vehicle. The power distribution device is configured to distribute the power to first land travel power to be supplied to the first land traveling device, second land travel power to be supplied to the second land traveling device, first water propulsion power to be supplied to the first water propelling device, and second water propulsion power to be supplied to the second water propelling device. The slippage-amount detection device is configured to detect a slippage amount of each of the first land traveling device and the second land traveling device relative to the ground. The controller is configured to reduce a corresponding one of the first land travel power or the second land travel power if the slippage amount of the first land traveling device or the second land traveling device detected by the slippage-amount detection device is greater than the threshold while the first land travel power, the second land travel power, the first water propulsion power and the second water propulsion power are respectively supplied to the first land traveling device, the second land traveling device, the first water propelling device and the second water propelling device, for landing from water to land.

With this configuration, slippage of the land traveling device that is slipping can be dissolved by reducing the land travel power to be supplied to the slipping land traveling device, of the first and second land traveling devices. Furthermore, a decrease in the land travel power to be supplied to the land traveling device that is not slipping is suppressed, and thereby it is possible to suppress a decrease in the land travel power in total. As a result, with the above configuration, it is possible to improve the landing ability even further.

In some embodiments, the controller is configured to adjust a ratio of the first water propulsion power to the second water propulsion power on the basis of a ratio of the first land travel power to the second land travel power.

With this configuration, even when the ratio of the first land travel power to the second land travel power is changed, the ratio of the first water propulsion power to the second water propulsion power is adjusted on the basis of the ratio of the first land travel power to the second land travel power, and thereby it is possible to suppress rotation of the amphibious vehicle. Specifically, it is possible to suppress rotation of the amphibious vehicle by increasing the water propulsion power to be supplied to the water propelling device on the side of the slipping land travel device, which makes it possible for the amphibious vehicle to advance stably. As a result, with the above configuration, it is possible to improve the landing ability even further.

In some embodiments, the amphibious vehicle further comprises a yaw-angle detection device configured to detect a yaw angle of the amphibious vehicle. The controller is configured to adjust a ratio of the first water propulsion power to the second water propulsion power on the basis of the yaw angle detected by the yaw-angle detection device.

With this configuration, even when the ratio of the first land travel power to the second land travel power is changed, the ratio of the first water propulsion power to the second water propulsion power is adjusted on the basis of the yaw angle, and thereby it is possible to suppress rotation of the amphibious vehicle. Specifically, the ratio of the first water propulsion power to the second water propulsion power is adjusted so as to cancel rotation, and thereby it is possible to suppress rotation of the amphibious vehicle. As a result, with the above configuration, it is possible to improve the landing ability even further.

In some embodiments, the slippage-amount detection device includes a sensor for measuring a rotation speed or a torque of the at least one land traveling device.

In some embodiments, the slippage-amount detection device further includes a vehicle-speed sensor for measuring a speed of the amphibious vehicle.

In some embodiments, the land traveling device has an endless track, and the water propelling device has a water jet.

According to at least one embodiment of the present invention, provided is a method of controlling an amphibious vehicle which comprises an engine, at least one land traveling device, and at least one water propelling device, the method comprising: a distribution step of distributing power outputted from the engine between land travel power which is to be supplied to the at least one land traveling device and water propulsion power which is to be supplied to the at least one water propelling device, for landing from water to land; a slippage-amount detection step of detecting a slippage amount of the at least one land traveling device relative to ground; and a land-travel-power controlling step of reducing the land travel power if the slippage amount detected in the slippage-amount detection step is greater than a threshold while the land travel power and the water propulsion power are supplied respectively to the at least one land traveling device and the at least one water propelling device.

With the above configuration, if the slippage amount of the land traveling device is greater than the threshold, the land travel power distributed to the land traveling device is reduced, and thus wasteful consumption of power outputted from the engine is suppressed. Further, since the land travel power is reduced, the slippage of the land traveling device is dissolved, and the power of the land traveling device is effectively applied to the ground. As a result, the amphibious vehicle can make effective use of the power outputted by the engine to move forward, regardless of the condition of the bottom of water, and thus has a high landing ability.

Advantageous Effects

According to at least one embodiment of the present invention, it is possible to provide an amphibious vehicle and a method of controlling the amphibious vehicle, whereby slippage of a land traveling device is suppressed regardless of the condition of the bottom of water and power outputted from an engine is effectively utilized, and thus a high landing ability is achieved.

BRIEF DESCRIPTION OF DRAWINGS

FIG. 4 is a schematic flowchart of a program to be executed by a controller of an amphibious vehicle according to some embodiments.

FIG. 5 is a chart showing an example of power distribution according to the program of FIG. 4.

FIG. 9 is a schematic flowchart of a program to be executed by a controller of an amphibious vehicle according to some embodiments.

FIG. 10 is a chart showing an example of power distribution according to the program of FIG. 9.

FIG. 11 is a schematic flowchart of a program to be executed by a controller of an amphibious vehicle according to some embodiments.

FIG. 12 is a chart showing an example of power distribution according to the program of FIG. 11.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

Figure 1:
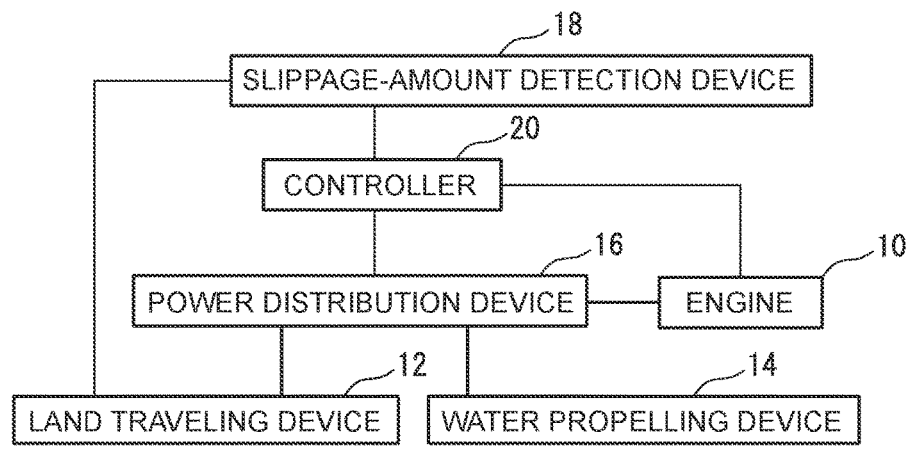
FIG. 1 is a block diagram of a schematic configuration of an amphibious vehicle according to some embodiments.

FIG. 1 is a block diagram of a schematic configuration of an amphibious vehicle according to some embodiments.

The amphibious vehicle includes an engine 10, at least one land traveling device 12, at least one water propelling device 14, a power distribution device 16, a slippage-amount detection device 18, and a controller 20.

The engine 10 is capable of outputting power for the amphibious vehicle to move, and comprises, for instance, a diesel engine.

The land traveling device 12 moves the amphibious vehicle by applying at least a part of the power outputted by the engine 10 to ground.

The water propelling device 14 moves the amphibious vehicle by applying at least a part of the power outputted by the engine 10 to water.

Figure 2:
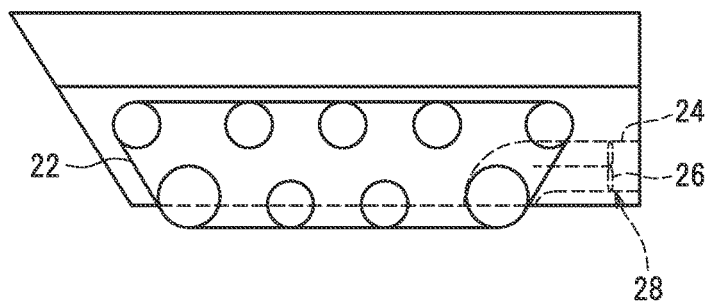
FIG. 2 is a schematic side view of an amphibious vehicle according to some embodiments.

FIG. 2 is a schematic side view of an amphibious vehicle according to some embodiments. The land traveling device 12 comprises a crawler (endless track, caterpillar) 22, and the water propelling device 14 comprises a water jet 28 including a propeller 26 disposed in an inner water channel 24.

Figure 3:
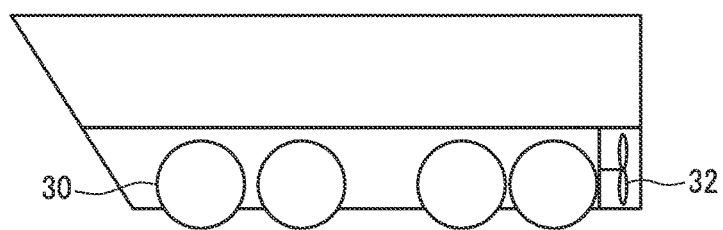
FIG. 3 is a schematic side view of an amphibious vehicle according to some embodiments.

FIG. 3 is a schematic side view of an amphibious vehicle according to some embodiments. The land traveling device 12 comprises tires 30, and the water propelling device 14 comprises a propeller 32.

The power distribution device 16 divides power outputted from the engine 10 into power to be distributed to the land traveling device 12 (land travel power) and power to be supplied to the water propelling device 14 (water propulsion power). The power distribution device 16 comprises an electronically-controlled torque divider, for instance, and can actively adjust the ratio of distribution of power to the land travel power.

The slippage-amount detection device 18 detects a slippage amount of the land traveling device 12 relative to ground.

The controller 20 comprises, for instance, a computer including a central processing unit (CPU), a memory, and an external storage. The controller 20 receives an input of a slippage amount detected by the slippage-amount detection device 18, and outputs a control signal to the power distribution device 16 on the basis of the slippage amount that is input to the controller 20. The power distribution device 16 is capable of adjusting the ratio of distribution of power to the land travel power (=land travel power/water propulsion power) on the basis of the control signal received from the controller 20. In other words, the controller 20 controls the power distribution device 16 on the basis of the slippage amount input thereto, and thereby adjusts at least the land travel power, of the land travel power and the water propulsion power.

In some embodiments, the amphibious vehicle operates under three different operation modes: land mode, intermediate mode, and water mode. The amphibious vehicle operates according to one operation mode selected from the three operation modes.

The land mode is a mode for traveling on land. When the land mode is selected, power is supplied only to the land traveling device 12, and not to the water propelling device 14.

The water mode is a mode for traveling on water. When the water mode is selected, power is supplied only to the water propelling device 14, and not to the land traveling device 12.

The intermediate mode is a mode for landing from water to land, and also for entering water from land. The intermediate mode is selected when the amphibious vehicle is on water and in a range of water depth at which the land traveling device 12 can be in contact with the bottom. When the intermediate mode is selected, power is supplied to both of the land traveling device 12 and the water propelling device 14, so that the land traveling device 12 applies power to the bottom of water and the water propelling device 14 applies power to water, and thereby the amphibious vehicle moves.

The operational mode may be selected automatically or manually. For instance, the operational mode may be selected automatically on the basis of a result of measurement of the height (water depth) of the amphibious vehicle from ground, measured by a ranging device such as a sonar. Alternatively, the operational mode may be selected automatically on the basis of a result of measurement of the loads applied to vehicle axles of the land traveling device 12, measured by a load detection device.

The controller 20 controls the power distribution device 16 to reduce the land travel power if the slippage amount detected by the slippage-amount detection device 18 exceeds a threshold while the land travel power and the water propulsion power are respectively supplied to the land traveling device 12 and the water propelling device 14 for landing from water to land, that is, while the intermediate mode is selected. In other words, the controller 20 reduces the ratio of distribution of power to the land travel power if the slippage amount detected by the slippage-amount detection device 18 is greater than a threshold while the intermediate mode is selected.

Now, a method of controlling the amphibious vehicle will be described. FIG. 4 is a schematic flowchart of a program to be executed by a controller 20 of an amphibious vehicle according to some embodiments. In some embodiments, the controller 20 executes the program of FIG. 4 repeatedly at regular or irregular intervals.

As depicted in FIG. 4, the controller 20 confirms whether the intermediate mode is in execution (operational-mode confirmation step S10). In other words, the controller 20 confirms whether land travel power and water propulsion power are respectively supplied to the land traveling device 12 and the water propelling device 14.

If the intermediate mode is in execution, the controller 20 detects a slippage amount of the land traveling device 12 relative to ground via the slippage-amount detection device 18 (slippage-amount detection step S12). Further, the controller 20 compares the detected slippage amount to a preset threshold (slippage-amount determination step S14).

As a result of comparison in the slippage-amount determination step S14, if the slippage amount of the land traveling device 12 is greater than the preset threshold, the controller 20 controls the power distribution device 16 to reduce the ratio of distribution of power to the land travel power (land-travel-power distribution ratio reducing step S16). In some embodiments, it is only the land travel power that is reduced, and the water propulsion power is unchanged.

After the land-travel-power distribution ratio reducing step S16, or if the confirmation result in the operation-mode confirmation step S10 or the comparison result in the slippage-amount determination step S14 is NO, the flow of the program ends for a time.

FIG. 5 is a chart showing an example of power distribution according to the program of FIG. 4, when the slippage amount is greater than the threshold. As depicted in FIG. 5, according to the program in FIG. 4, if the slippage amount is greater than the threshold, the ratio of distribution of power to the land travel power (=land travel power/water propulsion power) is reduced (target value 10/10 to 7/10), where only the land travel power is reduced (target value 10 to 7) and the water propulsion power is unchanged (target value 10 to 10).

With the above configuration, if the slippage amount of the land traveling device 12 is greater than the threshold, the land travel power distributed to the land traveling device 12 is reduced, and thus wasteful consumption of power outputted from the engine 10 is suppressed. Further, since the land travel power is reduced, the slippage of the land traveling device 12 is dissolved, and the power of the land traveling device 12 is effectively applied to the ground. As a result, the amphibious vehicle can make effective use of the power outputted by the engine to move forward, regardless of the condition of the bottom of water, and thus has a high landing ability.

Figures 6, 7:
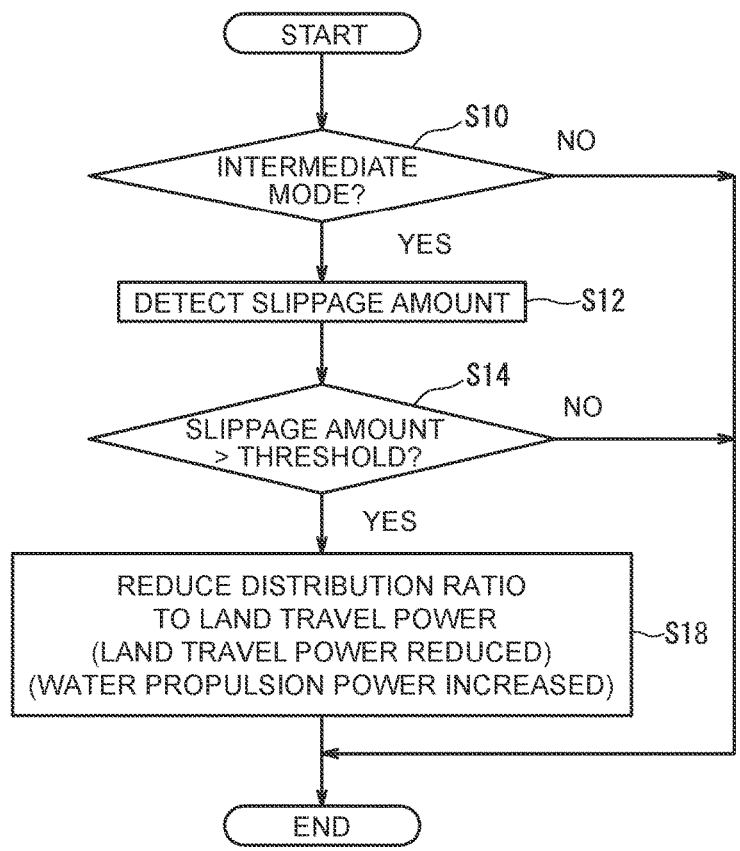
FIG. 6 is a schematic flowchart of a program to be executed by a controller of an amphibious vehicle according to some embodiments.
FIG. 7 is a chart showing an example of power distribution according to the program of FIG. 6.

FIG. 6 is a schematic flowchart of a program to be executed by the controller 20 of an amphibious vehicle according to some embodiments. FIG. 7 is a chart of an example of power distribution according to the program of FIG. 6.

The program of FIG. 6 is different from the program of FIG. 4 in that the water propulsion power is increased in the land-travel-power distribution ratio reducing step S18. With this configuration, the water propulsion power is increased (target value 10 to 13) when the land traveling device 12 slips on ground, and thereby it is possible to compensate for the decrease in the land travel power, and thereby to improve the landing ability even further.

Figure 8:
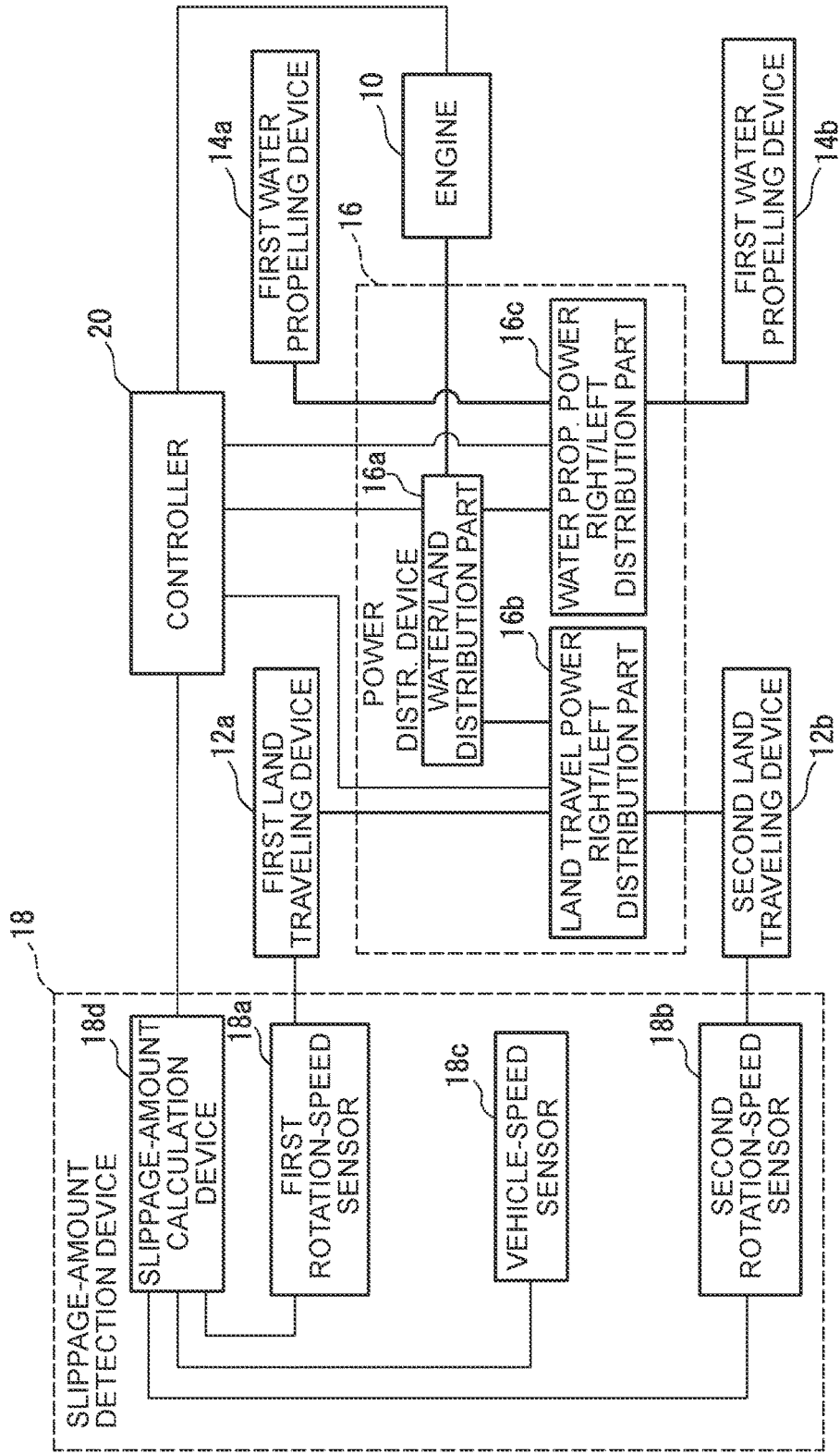
FIG. 8 is a block diagram of a schematic configuration of an amphibious vehicle according to some embodiments.

FIG. 8 is a block diagram of a schematic configuration of an amphibious vehicle according to some embodiments. The amphibious vehicle in FIG. 8 includes a first land traveling device 12a disposed on the right side of the amphibious vehicle and a second land traveling device 12b disposed on the left side of the amphibious vehicle, both serving as a land traveling device.

Further, the amphibious vehicle includes a first water propelling device 14a disposed on the right side of the amphibious vehicle and a second water propelling device 14b disposed on the left side of the amphibious vehicle, both serving as a water propelling device.

The power distribution device 16 includes: a water/land distribution part 16a which divides the output of the engine into land travel power and water propulsion power; a land-travel power right/left distribution part (variable-speed steering device) 16b that divides the land travel power into the first land travel power to be distributed to the first land traveling device 12a and the second land travel power to be distributed to the second land traveling device 12b; and a water-propulsion-power right/left distribution part 16c that divides the water propulsion power into the first water propulsion power to be distributed to the first water propelling device 14a and the second water propulsion power to be distributed to the second water propelling device 14b.

The slippage-amount detection device 18 includes the first rotation-speed sensor 18a, the second rotation-speed sensor 18b, a vehicle-speed sensor 18c, and a slippage-amount calculation device 18d.

The first rotation-speed sensor 18a is capable of detecting the rotation speed of the first land traveling device 12a (rotation speed V1); the second rotation-speed sensor 18b is capable of detecting the rotation speed of the second land traveling device 12b (rotation speed V2); the vehicle-speed sensor 18c is capable of detecting the actual speed of the amphibious vehicle (vehicle speed V0). As the vehicle-speed sensor 18c, a gyro, a laser Doppler meter, a pitot tube, an acceleration sensor, a global positioning system (GPS), or the like may be used.

The slippage-amount calculation device 18d comprises, for instance, a computer including a central processing unit (CPU), a memory, and an external storage, and may be provided integrally with the controller 20. The slippage-amount calculation device 18d calculates the slippage amount S1 of the first land traveling device 12a relative to the ground, by using an expression $S1=(V1-V0)/V1$, on the basis of the rotation speed V1 of the first land traveling device 12a detected by the first rotation-speed sensor 18a and the vehicle speed V0 of the amphibious vehicle detected by the vehicle-speed sensor 18c. Further, the slippage-amount calculation device 18d calculates the slippage amount S2 of the second land traveling device 12a relative to the ground, by using an expression $S2=(V2-V0)/V2$, on the basis of the rotation speed V2 of the second land traveling device 12b detected by the second rotation-speed sensor 18b and the vehicle speed V0 of the amphibious vehicle detected by the vehicle-speed sensor 18c.

The slippage amount S1 and the slippage amount S2 calculated by the slippage-amount calculation device 18d are input into the controller 20. On the basis of the slippage amount S1 and the slippage amount S2, the controller 20 controls the distribution ratios of the water/land distribution part 16a, the land-travel-power right/left distribution part 16b, and the water-propelling-power right/left distribution part 16c of the power distribution device 16.

Specifically, the controller 20 is configured to reduce a corresponding one of the first land travel power or the second land travel power if the slippage amount S1 of the first land traveling device 12a or the slippage amount S2 of the second land traveling device 12b detected by the slippage-amount detection device 18 exceeds a threshold, while the first land travel power, the second land travel power, the first water propulsion power, and the second water propulsion power are respectively supplied to the first land traveling device 12a, the second land traveling device 12b, the first water propelling device 14a, and the second water propelling device 14b for landing from water to land.

For instance, if the slippage amount of only one of the first land traveling device 12a or the second land traveling device 12b is greater than a threshold, the controller 20 controls the water/land distribution part 16a to reduce the ratio of distribution of power to the land traveling devices, and controls the land travel power right/left distribution part 16b to reduce the ratio of land travel power to be supplied to the land traveling device that is slipping, and increase the ratio of land travel power to be supplied to the land traveling device that is not slipping.

Furthermore, for instance, if the slippage amounts of both of the first land traveling device 12a and the second land traveling device 12b are greater than a threshold, the controller 20 controls the water/land distribution part 16a to reduce the ratio of distribution of power to the land traveling devices, and controls the land travel power right/left distribution part 16b to reduce the land travel power to be supplied to the first land traveling device 12a and to the second land traveling device 12b in accordance with the slippage amounts S1, S2. In this case, the controller 20 can control the land travel power right/left distribution part 16b so that less land travel power is supplied to the land travel device with a greater slippage amount. Further, if the slippage amounts S1, S2 are substantially the same, the first land travel power and the second land travel power may be supplied at an equal ratio to the first land traveling device 12a and to the second land traveling device 12b.

Further, the controller 20 adjusts the ratio of the first water propulsion power to the second water propulsion power on the basis of the ratio of the first land travel power to the second land travel power.

FIG. 9 is a schematic flowchart of a program to be executed by the controller 20 of the amphibious vehicle in FIG. 8 repeatedly, at regular or irregular intervals. When the intermediate mode is selected, the rotation speeds V1 and V2 are detected (rotation-speed detection step S20), and the vehicle speed V0 is detected (vehicle-speed detection step S22).

Further, the slippage amount S1 is calculated on the basis of the rotation speed V1 and the vehicle speed V0, and the slippage amount S2 is calculated on the basis of the rotation speed V2 and the vehicle speed V0 (slippage-amount calculation step S24). The calculated slippage amount S1 and slippage amount S2 are compared with a preset threshold (slippage-amount determination step S26).

If at least one of the slippage amount S1 or the slippage amount S2 is greater than the threshold, the ratio of distribution of power to land travel power (=land travel power/water propulsion power) is reduced so as to suppress slippage of the land traveling device on the basis of the slippage amount S1 and the slippage amount S2 (land-travel-power distribution ratio reduction step S28). At this time, the land travel power is reduced, and the water propulsion power is kept unchanged.

Then, on the basis of the slippage amount S1 and the slippage amount S2, the ratio of right/left distribution of the land travel power (=the first land travel power/the second land travel power) is changed so as to suppress slippage of the first land traveling device 12a and the second land traveling device 12b (land-travel-power right/left distribution ratio changing step S30).

Furthermore, the ratio of right/left distribution of water propulsion power (=the first water propulsion power/the second water propulsion power) is changed so as to make up for the unbalance between the first land travel power and the second land travel power that occurs due to a change in the ratio of right/left distribution of land travel power (water-propulsion-power right/left distribution ratio changing step S32).

After the water-propulsion-power right/left distribution ratio changing step S32 ends, or if the confirmation result in the operation-mode confirmation step S10 or the determination result in the slippage-amount determination step S26 is NO, the flow of the program ends for a time.

FIG. 10 is a chart showing an example of power distribution according to the program of FIG. 9, when the slippage amount S1 of the first land traveling device 12a is greater than a threshold. As depicted in FIG. 10, according to the program in FIG. 9, if the slippage amount S1 of the first land traveling device 12a is greater than a threshold, the ratio of distribution of power to the land travel power (=land travel power/water propulsion power) is reduced (target value 10/10 to 7/10), where the land travel power alone is reduced (target value 10 to 7) and the water propulsion power is kept unchanged (target value 10 to 10).

As the ratio of right/left distribution of the land travel power is changed (target value 5/5 to 3/4) and the first land travel power decreases (target value 5 to 3), the ratio of right/left distribution of the water propelling power is changed (target value 5/5 to 6/4) and the first water propulsion power increases (target value 5 to 6). In the present example, the second land travel power also decreases with a decrease in the ratio of distribution to the land travel power (target value 5 to 3).

With the amphibious vehicle having a configuration of FIG. 8, slippage of the slipping land traveling device can be dissolved by reducing the land travel power to be supplied to the slipping land traveling device, of the first land traveling device 12a and the second land traveling device 12b. Furthermore, a decrease in the land travel power to be supplied to the not-slipping land traveling device is suppressed, and thereby it is possible to suppress a decrease in the land travel power in total. As a result, with the above configuration, it is possible to improve the landing ability even further.

Furthermore, with the above configuration, even when the ratio of the first land travel power to the second land travel power is changed, the ratio of the first water propulsion power to the second water propulsion power is adjusted on the basis of the ratio of the first land travel power to the second land travel power, and thereby it is possible to suppress rotation of the amphibious vehicle. Specifically, it is possible to suppress rotation of the amphibious vehicle by increasing the water propulsion power to be supplied to the water propelling device on the slipping side, which makes it possible for the amphibious vehicle to move stably. As a result, with the above configuration, it is possible to improve the landing ability even further.

FIG. 11 is a schematic flowchart of a program to be executed by the controller 20 of an amphibious vehicle according to some embodiments. FIG. 12 is a chart of an example of power distribution according to the program of FIG. 11.

The program of FIG. 11 is different from the program of FIG. 9 in that the water propulsion power is increased in the land-travel-power distribution ratio reducing step S34. With this configuration, the water propulsion power is increased (target value 10 to 13) when the first land traveling device 12a or the second land traveling device 12b slips on ground, and thereby it is possible to compensate for the decrease in the land travel power, and thereby to improve the landing ability even further.

Figure 13:
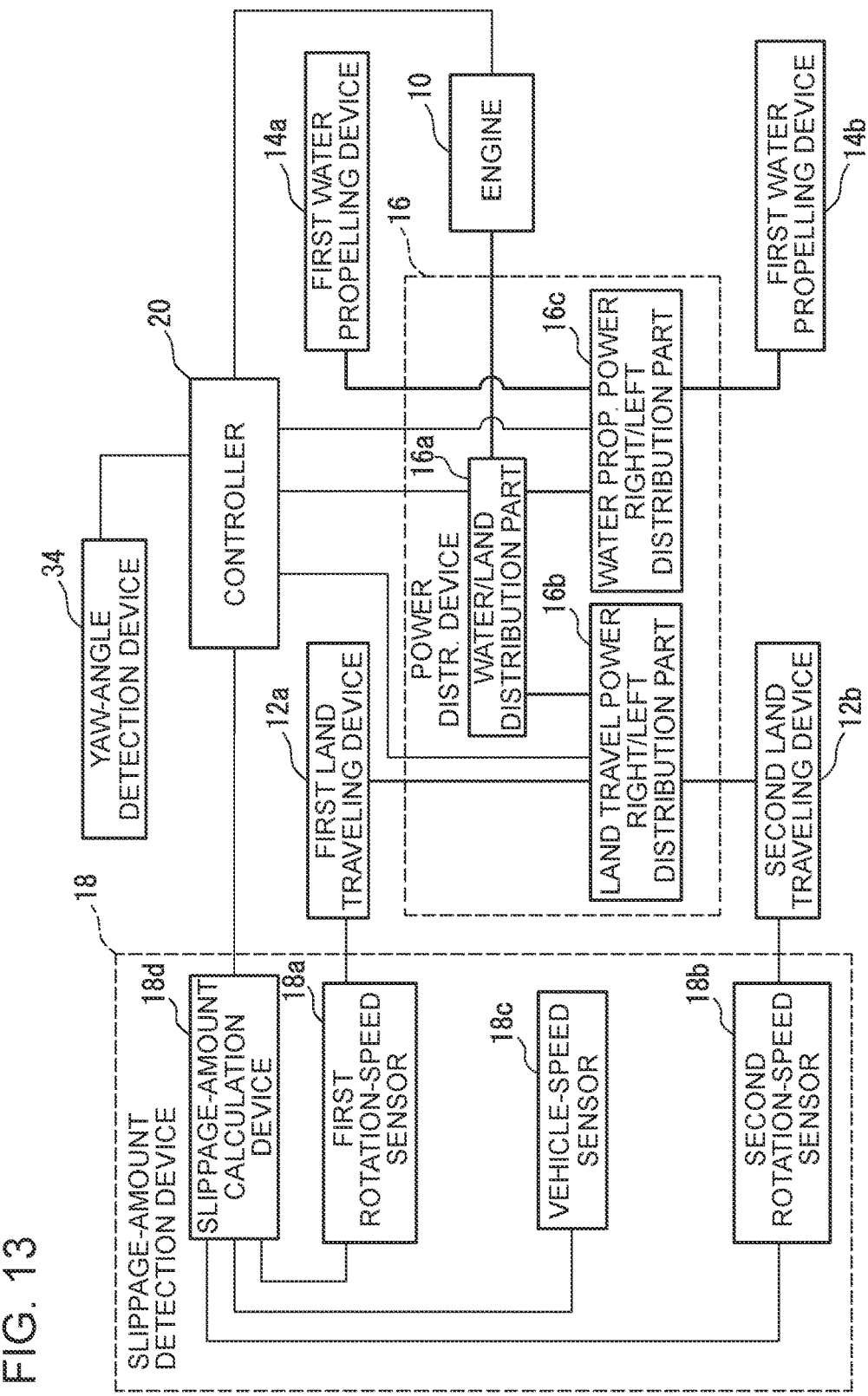
FIG. 13 is a block diagram of a schematic configuration of an amphibious vehicle according to some embodiments.

FIG. 13 is a block diagram of a schematic configuration of an amphibious vehicle according to some embodiments. The amphibious vehicle in FIG. 13 is different from the amphibious vehicle in FIG. 8 in that the amphibious vehicle further includes a yaw-angle detection device 34 which can detect a yaw angle (rotational angle) of the amphibious vehicle.

Further, the controller 20 adjusts the ratio of the first water propulsion power to the second water propulsion power on the basis of the yaw angle of the amphibious vehicle detected by the yaw-angle detection device 34, instead of the ratio of the first land travel power to the second land travel power. Specifically, the controller 20 adjusts the ratio of the first water propulsion power to the second water propulsion power so as to cancel the yaw angle that is formed by the unbalance between the first land travel power to the second land travel power.

Figure 14:
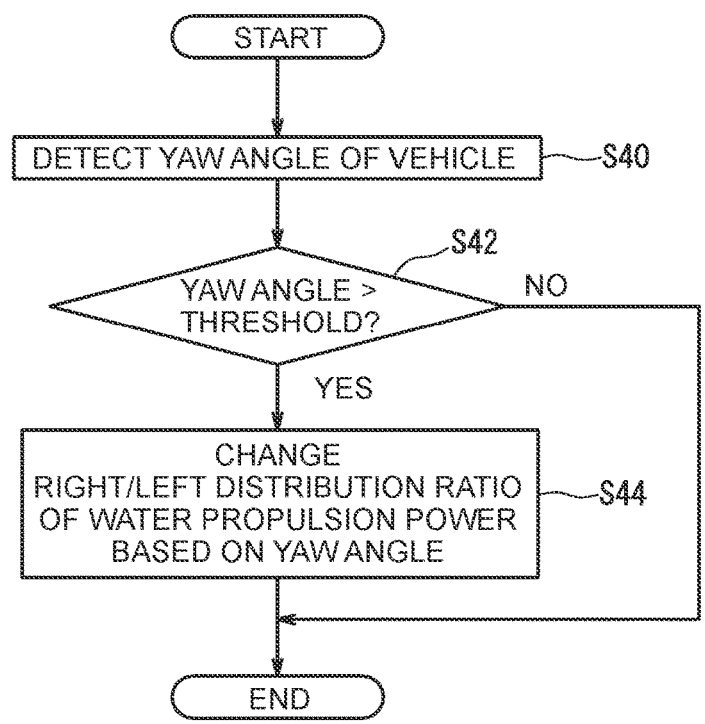
FIG. 14 is a schematic flowchart of a program to be executed by a controller of an amphibious vehicle according to some embodiments.

FIG. 14 is a schematic flowchart of a program for adjusting the ratio of the first water propulsion power to the second water propulsion power on the basis of a yaw angle. The program in FIG. 14 is executed instead of the water-propelling-power right/left distribution ratio changing step S32 of the programs in FIGS. 9 and 11.

In the program of FIG. 14, the yaw angle of the amphibious vehicle is detected (yaw-angle detection step S40). The detected yaw angle is compared with a preset threshold (yaw-angle determination step S42). If the yaw angle is greater than the threshold, the ratio of the first water propulsion power to the second water propulsion power is changed on the basis of the yaw angle (water-propelling-power right/left distribution ratio changing step S44).

After the water-propelling-power right/left distribution ratio changing step S44 ends, or if the determination result in the yaw-angle determination step S42 is NO, the flow of the program ends.

With this configuration, even when the ratio of the first land travel power to the second land travel power is changed, the ratio of the first water propulsion power to the second water propulsion power is adjusted on the basis of yaw angle (rotation angle), and thereby it is possible to suppress rotation of the amphibious vehicle. Specifically, the ratio of the first water propulsion power to the second water propulsion power is adjusted so as to cancel rotation, and thereby it is possible to suppress rotation of the amphibious vehicle. As a result, with the above configuration, it is possible to improve the landing ability even further.

In some embodiments, the slippage-amount detection device 18 may not necessarily include the vehicle-speed sensor 18c depicted in FIGS. 8 and 13. In this case, the slippage amounts of the first land traveling device 12a and of the second land traveling device 12b can be detected on the basis of a change in the rotation speeds V1 and V2 detected by the first rotation-speed sensor 18a and the second rotation-speed sensor 18b, respectively. Furthermore, instead of the first rotation-speed sensor 18a and the second rotation-speed sensor 18b, a first torque sensor for detecting the torque of the first land traveling device 12a and a second torque sensor for detecting the torque of the second land traveling device 12b may be provided, to detect the slippage amounts of the first land traveling device 12a and the second land traveling device 12b on the basis of the torque changes of the first land traveling device 12a and the second land traveling device 12b, respectively.

In some embodiments, after being reduced, the ratio of distribution of power to the land travel power may be restored in a predetermined time or after traveling a predetermined distance. Furthermore, in some embodiments, after being changed, the ratio of the first land travel power to the second land travel power may be restored in a predetermined time or after traveling a predetermined distance. After a lapse of a predetermined time or after traveling a predetermined distance, the condition of the bottom of water may change, and the slippage of the land traveling device 12 may no longer take place even with a high land traveling power. Thus, restoring the ratio of distribution of power to land travel power or the ratio of the first land travel power to the second land travel power makes it possible to make effective use of the output of the engine to improve the landing performance even further.

Embodiments of the present invention were described in detail above, but the present invention is not limited thereto, and various amendments and modifications may be implemented.

For instance, the controller 20 may reduce the output of the engine 10 without changing the ratio of distribution of power to the land travel power if the slippage amount detected by the slippage-amount detection device 18 exceeds a threshold. Also with the above configuration, if the slippage amount of the land traveling device 12 is greater than a threshold, the land travel power distributed to the land traveling device 12 is reduced, and thus wasteful consumption of power outputted from the engine 10 is suppressed. Further, since the land travel power is reduced, the slippage of the land traveling device 12 is dissolved, and the power of the land traveling device 12 acts effectively on the ground. As a result, the amphibious vehicle can make effective use of the power outputted from the engine to move forward, regardless of the condition of the bottom of water, and thus has a high landing ability.

DESCRIPTION OF REFERENCE NUMERALS

10 Engine
12 Land traveling device
14 Water propelling device
16 Power distribution device
18 Slippage-amount detection device
20 Controller

The invention claimed is:
1. An amphibious vehicle, comprising:
an engine;
at least one land traveling device;
at least one water propelling device;
a power distribution device configured to distribute power outputted from the engine between land travel power which is to be supplied to the at least one land traveling device and water propulsion power which is to be supplied to the at least one water propelling device;
a slippage-amount detection device configured to detect a slippage amount of the at least one land traveling device relative to ground; and
a controller configured to adjust at least the land travel power, of the land travel power and the water propulsion power, on the basis of the slippage amount detected by the slippage-amount detection device,
wherein the controller is configured to reduce the land travel power and increase or maintain unchanged the water propulsion power, if the slippage amount detected by the slippage-amount detection device is greater than a threshold while the land travel power and the water propulsion power are supplied respectively to the at least one land traveling device and the at least one water propelling device for landing from water to land.
2. The amphibious vehicle according to claim 1,
wherein the controller is configured to increase the water propulsion power if the slippage amount detected by the slippage-amount detection device is greater than the threshold.
3. The amphibious vehicle according to claim 1,
wherein the at least one land traveling device comprises a first land traveling device disposed on a right side of the amphibious vehicle and a second land traveling device disposed on a left side of the amphibious vehicle,
wherein the at least one water propelling device comprises a first water propelling device disposed on the right side of the amphibious vehicle and a second water propelling device disposed on the left side of the amphibious vehicle, wherein the power distribution device is configured to distribute the power to first land travel power to be supplied to the first land traveling device, second land travel power to be supplied to the second land traveling device, first water propulsion power to be supplied to the first water propelling device, and second water propulsion power to be supplied to the second water propelling device, wherein the slippage-amount detection device is configured to detect a slippage amount of each of the first land traveling device and the second land traveling device relative to the ground, and wherein the controller is configured to reduce a corresponding one of the first land travel power or the second land travel power if the slippage amount of the first land traveling device or the second land traveling device detected by the slippage-amount detection device is greater than the threshold while the first land travel power, the second land travel power, the first water propulsion power and the second water propulsion power are respectively supplied to the first land traveling device, the second land traveling device, the first water propelling device and the second water propelling device, for landing from water to land.

4. The amphibious vehicle according to claim 3, wherein the controller is configured to adjust a ratio of the first water propulsion power to the second water propulsion power on the basis of a ratio of the first land travel power to the second land travel power.

5. The amphibious vehicle according to claim 3, further comprising a yaw-angle detection device configured to detect a yaw angle of the amphibious vehicle, wherein the controller is configured to adjust a ratio of the first water propulsion power to the second water propulsion power on the basis of the yaw angle detected by the yaw-angle detection device.

6. The amphibious vehicle according to claim 1, wherein the slippage-amount detection device includes a sensor for measuring a rotation speed or a torque of the at least one land traveling device.

7. The amphibious vehicle according to claim 6, wherein the slippage-amount detection device further includes a vehicle-speed sensor for measuring a speed of the amphibious vehicle.

8. The amphibious vehicle according to claim 1, wherein the land traveling device has an endless track, and wherein the water propelling device has a water jet.

9. A method of controlling an amphibious vehicle which comprises an engine, at least one land traveling device, and at least one water propelling device, the method comprising:

a distribution step of distributing power outputted from the engine between land travel power which is to be supplied to the at least one land traveling device and water propulsion power which is to be supplied to the at least one water propelling device, for landing from water to land;

a slippage-amount detection step of detecting a slippage amount of the at least one land traveling device relative to ground; and a land-travel-power controlling step of reducing the land travel power and increasing or maintaining unchanged the water propulsion power, if the slippage amount detected in the slippage-amount detection step is greater than a threshold while the land travel power and the water propulsion power are supplied respectively to the at least one land traveling device and the at least one water propelling device.

* * * * *